United States Patent
Mello et al.

(10) Patent No.: US 9,702,225 B2
(45) Date of Patent: Jul. 11, 2017

(54) SURFACE MODIFICATION AGENT TO PROLONG SCALE INHIBITOR LIFETIME

(71) Applicant: HALLIBURTON ENERGY SERVICES, INC., Houston, TX (US)

(72) Inventors: Jesse V. Mello, Houston, TX (US); Corneliu Stanciu, Lake Charles, LA (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 20 days.

(21) Appl. No.: 14/711,709

(22) Filed: May 13, 2015

(65) Prior Publication Data

US 2016/0333669 A1 Nov. 17, 2016

(51) Int. Cl.
| | |
|---|---|
| E21B 37/06 | (2006.01) |
| E21B 43/26 | (2006.01) |
| E21B 43/267 | (2006.01) |
| C09K 8/528 | (2006.01) |
| C09K 8/66 | (2006.01) |
| C09K 8/70 | (2006.01) |

(Continued)

(52) U.S. Cl.
CPC .............. *E21B 37/06* (2013.01); *C09K 8/528* (2013.01); *C09K 8/66* (2013.01); *C09K 8/70* (2013.01); *C09K 8/80* (2013.01); *C09K 8/92* (2013.01); *E21B 43/26* (2013.01); *E21B 43/267* (2013.01)

(58) Field of Classification Search
CPC ........ E21B 37/06; E21B 43/26; E21B 43/267; C09K 8/805; C09K 8/52
USPC ......... 166/308.1, 280.2, 305.1, 280.1, 250.1, 166/308.2
See application file for complete search history.

(56) References Cited

U.S. PATENT DOCUMENTS

| | | | |
|---|---|---|---|
| 5,038,861 | A | 8/1991 | Shuler |
| 6,613,720 | B1 * | 9/2003 | Feraud ..................... C09K 8/62 166/300 |
| 6,764,980 | B2 | 7/2004 | Bates et al. |

(Continued)

OTHER PUBLICATIONS

M.M. Jordan, K.S. Sorbie, Ping Jiang, Mingdong Yuan, A.C. Todd, Heriot-Watt U., Kate Taylor, Shell UK E&P, K.E. Hourston, Total Oil Marine & Kari Ramstad, Norsk Hydro A/S. Mineralogical Controls on Inhibitor Adsorption/Desorption in Brent Group Sandstone and their Importance in Prediction and Extending Field Squeeze Lifetimes, European Production Operations Conference & Exhibition, 1994, pp. 141-153, SPE-27607-MS, Aberdeen, United Kindgdom, SPE Richardson, Texas 75083 USA.

(Continued)

*Primary Examiner* — Silvana Runyan
(74) *Attorney, Agent, or Firm* — McGuireWoods LLP

(57) ABSTRACT

A method of treating a subterranean formation comprising: introducing a first treatment fluid into a well, wherein the first treatment fluid comprises a base fluid and a scale inhibitor; and introducing a second treatment fluid into the well, wherein the second treatment fluid comprises a base fluid and a surface modification agent, wherein the surface modification agent is a hydrophobically modified polyamide. A method of fracturing a subterranean formation comprising: introducing a fracturing fluid into a well, wherein the introduction of the fracturing fluid creates or enhances a fracture in the subterranean formation, wherein the fracturing fluid comprises: a base fluid; proppant; a scale inhibitor; and the surface modification agent.

8 Claims, 2 Drawing Sheets

(51) Int. Cl.
*C09K 8/80* (2006.01)
*C09K 8/92* (2006.01)

(56) References Cited

U.S. PATENT DOCUMENTS

| | | | |
|---|---|---|---|
| 8,101,554 B2 | 1/2012 | Montgomerie et al. | |
| 2004/0043906 A1* | 3/2004 | Heath | C09K 8/536 507/200 |
| 2005/0107503 A1* | 5/2005 | Couillet | C09K 8/62 524/249 |
| 2005/0202978 A1* | 9/2005 | Shumway | C09K 8/265 507/203 |
| 2007/0281869 A1* | 12/2007 | Drochon | C09K 8/602 507/219 |
| 2014/0155299 A1 | 6/2014 | Hardy et al. | |
| 2014/0190700 A1* | 7/2014 | Tang | E21B 43/025 166/307 |
| 2016/0340571 A1* | 11/2016 | Liang | C09K 8/68 |

OTHER PUBLICATIONS

R.J. Powell, R.D. Gdansk, M.A. McCabe, D.C. Buster, Halliburton Energy Services, Controlled-Release Scale Inhibitor for Use in Fracturing Treatments, International Symposium on Oilfield Chemistry, San Antonio, Feb. 1995, pp. 571-579, SPE-28999, SPE Richardson, Texas 75083 USA.

G.M. Graham SPE (Scaled Solutions), A. Gyani SPE (BP, Sunbury), M.M. Jordan SPE (Ondeo Nalco), C. Strachan SPE (TROS), R. McClure (TROS), I.J. Littlehales (Scaled Solutions), A. Fitzgerald (BP Houston), Selection and Application of a Non-Damaging Scale Inhibitor Package for Pre-Emptive Squeeze in Mungo Production Wells, SPE Oilfield Scale Symposium, Aberdeen, United Kingdom, Jan. 30-31, 2002, pp. 1-16, SPE-74665, SPE Richardon, Texas 75083 USA.

R. Gdanski, SPE, and G.P. Funkhouser, SPE, Halliburton, Mineralogy Driven Scale Inhibitor Squeeze Designs, SPE European Formation Damage Conference, Scheveningen, The Netherland, May 25-27, 2005, pp. 2-8, SPE-94510, SPE Richardson, Texas 75083 USA.

Rick Gdanski, SPE, Halliburton, Formation Mineralogy Impacts Scale Inhibitor Squeeze Designs, SPE Europec/EAGE Annual Conference & Exhibition, Rome Italy, Jun. 9-12, 2008, pp. 1-14, SPE-113261, SPE Richardson, Texas 75083 USA.

Niall Fleming, SPE, Kari Ramstad, SPE, Anne-Mette Mathisen, SPE, Statoilhydro, Alex Nelson, Scaled Solutions, SPE and Sam Kidd, SPE, Scaled Solutions, Innovative Use of Kaolinite in Downhole Scale Management: Squeeze-Life Enhancement and Water Shutoff, SPE International Oilfield Scale Conference, Aberdeen, May 28-29, 2008, pp. 439-449, SPE-113656, Aug. 2009 SPE Production & Operations, SPE Richardson, Texas 75083 USA.

D.V. Satya Gupta, SPE, J. Mike Brown, SPE, Steve Szymczak, SPE, BJ Services Company, Multi-Year Scale Inhibition from a Solid Inhibitor Applied during Stimulation, SPE Annual Technical Conference & Exhibition Denver, Colorado, Sep. 21-24, 2008, pp. 2-15, SPE-115655, SPE Richardson, Texas 75083 USA.

* cited by examiner

SURFACE MODIFICATION AGENT TO PROLONG SCALE INHIBITOR LIFETIME

TECHNICAL FIELD

Scale inhibitors can be used to prevent or reduce the amount of scale buildup in a well or subterranean formation. A surface modification agent can be used to prolong the lifetime of a scale inhibitor used in the well or formation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
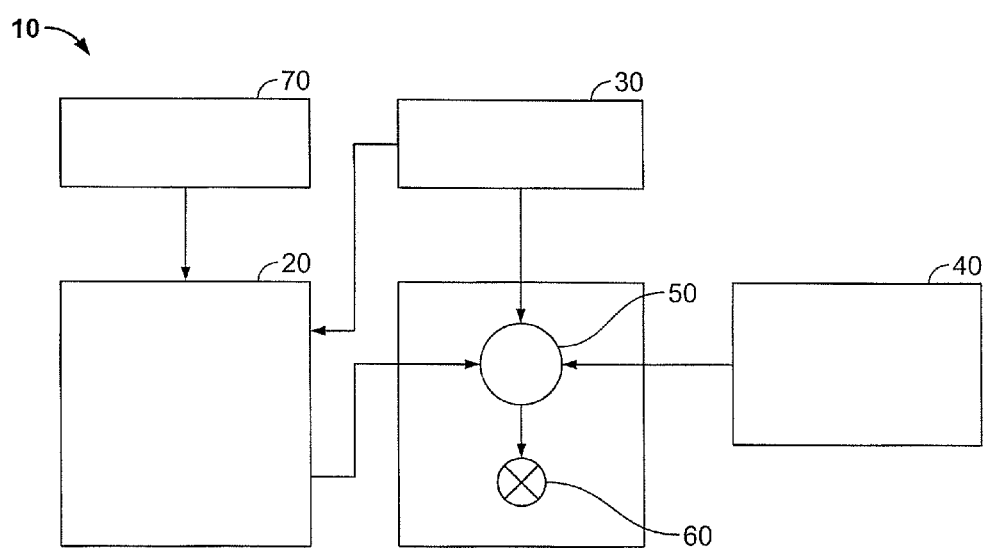
FIG. 1 is a diagram illustrating a fracturing system according to certain embodiments.

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere (atm) (0.1 megapascals (MPa)). A fluid can be a liquid or gas. A homogenous fluid has only one phase, whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. As used herein, the term "treatment fluid" refers to the specific composition of the fluid as it is being introduced into a well. The word "treatment" in the term "treatment fluid" does not necessarily imply any particular action by the fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

After a wellbore is drilled, it may often be necessary to fracture the subterranean formation to enhance hydrocarbon production. A fracturing fluid, often called a pad fluid, is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid and can be referred to as "man-made." Fracturing a subterranean formation typically requires hundreds of thousands of gallons of fracturing fluid. Further, it is often desirable to fracture at more than one downhole location. Therefore, the base fluid of a fracturing fluid is usually water or water-based for various reasons, including the ready availability of water and the relatively low cost of water compared to other liquids.

The newly created or enhanced fracture will tend to close together after pumping of the fracturing fluid has stopped due to the weight of the subterranean formation. To prevent the fracture from closing, a material must be placed in the fracture to keep the fracture propped open. A material used for this purpose is often referred to as a "proppant." The proppant is in the form of solid particles, which can be suspended in the fracturing fluid, carried downhole, and deposited in the fracture as a "proppant pack." The proppant pack generally props the fracture in an open position while allowing fluid flow through the permeability of the pack.

Proppant materials generally include silicon dioxide, nut shells, sintered bauxite, glass, plastics, ceramic materials, and any combination thereof in any proportion. The proppant is an appropriate size to prop open the fracture and allow fluid to flow through the proppant pack; that is, between and around the proppant making up the pack. Appropriate sizes of particulate for use as a proppant are typically in the range from about 8 to about 100 U.S. standard mesh. A typical proppant is sand-sized, which geologically is defined as having a largest dimension ranging from 0.0625 millimeters up to 3 millimeters.

Scale can form on the proppant of a proppant pack or in the subterranean formation during production of a reservoir fluid. The scale can reduce the flow rate of the produced reservoir fluid. Various methods have been developed to address the problems caused by downhole scale formation including continuous injection of a scale inhibitor, scale squeeze treatments, and the placement of a liquid or solid scale inhibitor into a proppant pack with a fracturing fluid. The scale inhibitor functions to prevent or reduce the amount of scale buildup on the formation, proppant pack, gravel pack, production tubing, and downhole equipment. The purpose of these treatments is to provide an effective concentration of scale inhibitor in the produced fluid when it experiences a change in equilibrium, which can cause scale formation. Changes in equilibrium such as flow rate, turbulence, pH, pressure, temperature, or the mixing of incompatible brines typically occur within the near wellbore area and as the produced fluid travels to the surface.

Scale treatments can be focused near the wellbore by conducting scale squeezes or by adding solid scale inhibitors to the proppant stage of a hydraulic fracturing operation. The effectiveness of a scale squeeze operation is generally dependent on the retention of the scale inhibitor in the subterranean formation and the release rate of the scale inhibitor. In an ideal situation the scale inhibitor would slowly leach into produced water at a concentration above the minimum inhibitory concentration (MIC) for a prolonged period of time—preferably up to a year or longer. In practice, scale inhibitor release profiles are generally characterized by a high initial release of the scale inhibitor into produced fluids followed by a decline curve that is a function of the interactions between the subterranean formation or proppant and the scale inhibitor. Thus, the lifetime of a scale squeeze treatment is complete when the concentration of the scale inhibitor falls below the MIC for the scaling brine.

Various techniques have been used to prolong the rate of release of a scale inhibitor into wellbore fluids, including pumping sparingly soluble or encapsulated solid scale inhibitors with proppant to help extend the lifetime of the scale inhibitor. However, these techniques have drawbacks. By way of example, the rate of release of a solid polyphosphate scale inhibitor is increased due to an increase in solubility at temperatures greater than 175° F. (79° C.) and it cannot provide long term scale inhibition. Thus, there is a need and ongoing industry-wide interest in methods of increasing the lifetime of scale inhibitors used in oil and gas operations.

It has been discovered that a surface modification agent can be used to alter the properties of proppant or a subterranean formation. These alterations can provide a slower rate of release of a scale inhibitor into wellbore or reservoir fluids and can increase the lifetime of the scale inhibitor.

According to certain embodiments, a method of treating a subterranean formation comprises: introducing a first treatment fluid into a well, wherein the first treatment fluid comprises a base fluid and a scale inhibitor; and introducing a second treatment fluid into the well, wherein the second treatment fluid comprises a base fluid and a surface modification agent, wherein the surface modification agent is a hydrophobically modified polyamide.

According to certain other embodiments, a method of fracturing a subterranean formation comprises: introducing a fracturing fluid into a well, wherein the introduction of the fracturing fluid creates or enhances a fracture in the subterranean formation, wherein the fracturing fluid comprises: a base fluid; proppant; a scale inhibitor; and the surface modification agent.

The discussion of preferred embodiments regarding the treatment fluid, fracturing fluid, or any ingredient in the fluids is intended to apply to all of the method embodiments. Any reference to the unit "gallons" means U.S. gallons.

Figure 2:
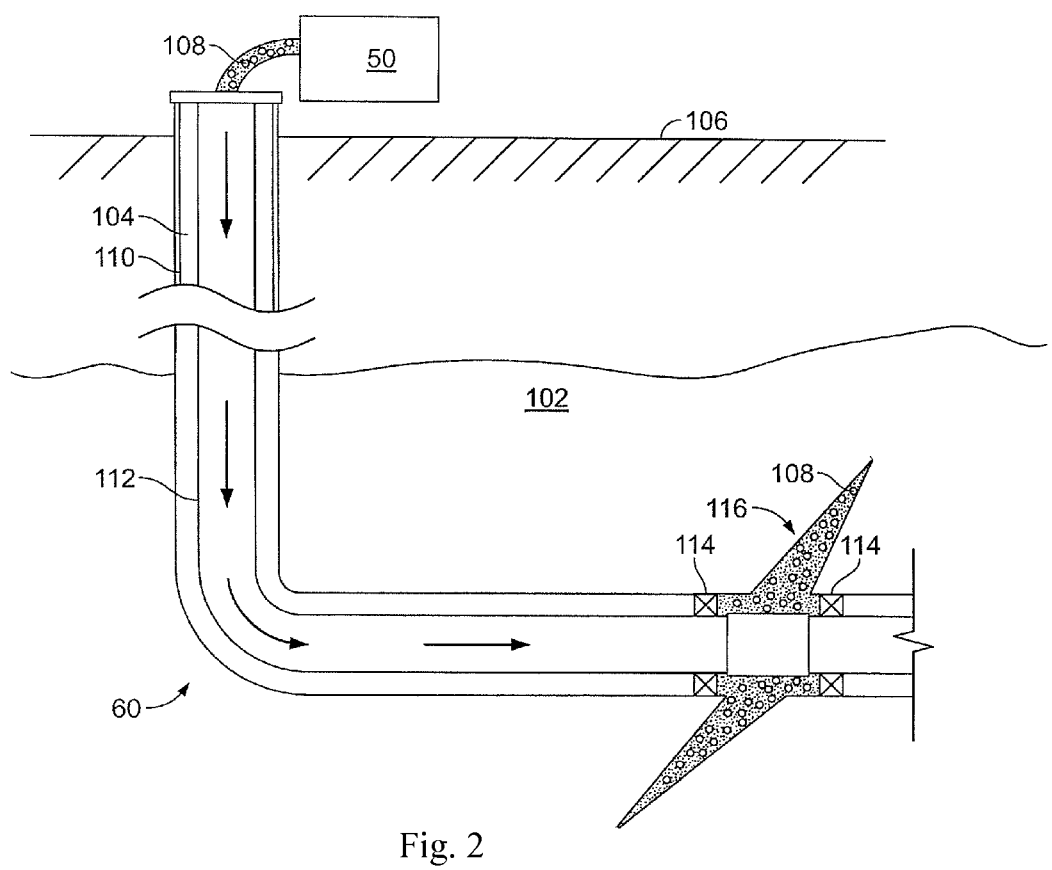
FIG. 2 is a diagram illustrating a well system in which a fracturing operation can be performed.

The following discussion related to FIGS. 1 and 2 pertains to any of the fluids (i.e., the fracturing fluid and the treatment fluid). It should be understood that any discussion related to a "fracturing fluid" is meant to include the first and second treatment fluids as well without the need to continually refer to all of the different types of fluids throughout. The fracturing system 10 of FIG. 1 can include a fluid-producing apparatus 20, a fluid source 30, a proppant source 40, and a pump and blender system 50 and resides at the surface at a well site where a well 60 is located. In certain embodiments, the fluid producing apparatus 20 combines a gel precursor with fluid (e.g., liquid or substantially liquid) from the fluid source 30 to produce a hydrated fluid that is introduced into the subterranean formation. The hydrated fluid can be a fluid for ready use in a fracture stimulation treatment of the well 60 or a concentrate to which additional fluid is added prior to use in a fracture stimulation of the well 60. In other instances, the fluid-producing apparatus 20 can be omitted and the fluid sourced directly from the fluid source 30.

The proppant source 40 can include a proppant (including micro-proppant) for combining with the fluid. The system may also include an additive source 70 that provides one or more additives (e.g., gelling agents, weighting agents, and/or other optional additives) to alter the properties of the fluid. This source can also have a hopper for on-the-fly coating of the proppant, or this source can be used to introduce pre-treated or pre-cured resin-coated proppant into a treatment fluid.

The pump and blender system 50 can receive the fluid and combine it with other components, including proppant from the proppant source 40 and/or additional fluid from the additives 70. The resulting mixture may be pumped down the well 60 under a pressure sufficient to create or enhance one or more fractures in a subterranean zone; for example, to stimulate production of fluids from the zone. The fluid-producing apparatus 20, fluid source 30, and/or proppant source 40 can each be equipped with one or more metering devices (not shown) to control the flow of fluids, proppant, and/or other compositions to the pumping and blender system 50. Such metering devices can facilitate the pumping. The blender system 50 can source from one, some, or all of the different sources at a given time and can facilitate the preparation of fracturing fluids using continuous mixing or on-the-fly methods. Thus, for example, the pumping and blender system 50 can provide just fracturing fluid into the well at some times, just proppant at other times, and combinations of those components at yet other times.

The fluid can be pumped into the subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The well includes a wellbore 104. The wellbore 104 extends from the surface 106, and a fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting, and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and/or other tools or well devices that control the flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. According to certain embodiments, the methods also include creating or enhancing one or more fractures within the subterranean formation using the fracturing fluid. The fracturing fluid 108 can be introduced into the wellbore 104 (e.g., in FIG. 2, the wellbore interval located between the packers 114) at a sufficient hydraulic pressure wherein one or more fractures 116 can be created in the subterranean formation 102.

The treatment fluids and the fracturing fluid include a base fluid. As used herein, the term "base fluid" means the liquid that is in the greatest concentration and is the solvent of a solution or the continuous phase of a heterogeneous fluid. The base fluid can include water. The water can be selected from the group consisting of fresh water, brackish water, sea water, brine, produced water—as it is or processed, and any combination thereof in any proportion. The treatment fluids and the fracturing fluid can also include water-miscible liquids, hydrocarbon liquids, and gases.

The treatment fluids and the fracturing fluid can also contain various other additives. The other additives can include, for example, surfactants, gel stabilizers, anti-oxidants, polymer-degradation-prevention additives, relative-permeability modifiers, corrosion inhibitors, foaming agents, defoaming agents, antifoaming agents, emulsifying agents, de-emulsifying agents, iron control agents, particulate diverters, salts, acids, fluid-loss-control additives, gas, catalysts, clay control agents, dispersants, flocculants, scavengers (e.g., $H_2S$ scavengers, $CO_2$ scavengers, or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed-release breakers, and combinations thereof.

The fracturing fluid also includes proppant. The proppant can be selected from the group consisting of nut shells, sand, ceramics, natural sand, quartz sand, particulate garnet, metal particulates, glass, nylon pellets, bauxite and other ores, polymeric materials, and combinations thereof in any proportion. The proppant can be substantially spherical in shape, fibrous materials, polygonal shaped (such as cubic), irregular shapes, and any combination thereof. The surface modification agent can be coated onto the proppant.

The proppant can also be coated with a curable resin or tackifying agent. The curable resin or tackifying agent can help the proppant form a proppant pack within the fracture. The curable resin can be part of a curing resin system. The curable resin can be any compound that is capable of curing (i.e., the process of gaining compressive strength and becoming hard). The curable resin can cure via a chemical reaction with a curing agent or via temperature. The curable resin can coat the proppant prior to or during introduction of the fracturing fluid into the well. The curable resin can also chemically bond with the surfaces of the proppant. According to certain embodiments, the curable resin is an epoxy, diepoxy, polyepoxy resin, phenol-formaldehyde, or furan-based resin. For example, the curable resin can be bisphenol A glycidyldiepoxy, glycidyl propyltrimethoxysilane. The curable resin can be in a concentration in the range of about 0.1% to about 10% by weight of the resin system.

The first treatment fluid and the fracturing fluid includes a scale inhibitor. The scale inhibitor can be a solid or a liquid. According to certain embodiments, the first treatment fluid includes a liquid scale inhibitor. For a liquid scale inhibitor, the scale inhibitor can be in a concentration in the range of about 0.25 to about 2 gallons/1,000 gallons (gal) of the base fluid. For a solid scale inhibitor, the scale inhibitor can be in a concentration in the range of about 1 to about 30 pounds (lbs)/1,000 gal of the base fluid. According to certain other embodiments, the fracturing fluid contains proppant that is coated with the surface modification agent and the scale inhibitor is a solid or a liquid. According to yet certain other embodiments, the fracturing fluid contains proppant that is not coated with the surface modification agent and the scale inhibitor is a solid and the solid scale inhibitor is coated with the surface modification agent. The surface modification agent can be coated onto the proppant or the solid scale inhibitor in a concentration in the range of about 0.5 to about 4 gal/1,000 lbs of the proppant. When the surface modification agent is not coated on the proppant or the solid scale inhibitor, for example, to treat the subterranean formation or a proppant pack, then the surface modification agent can be in a concentration in the range of about 10 to about 75 gal/1,000 gal of the base fluid.

The scale inhibitor can be any compound that prevents or reduces the amount of scale that could build up on the proppant or within the subterranean formation. The scale inhibitor can be an aqueous-based anionic compound, an oil-soluble compound, or an oil-miscible compound. For oil-soluble compounds, the scale inhibitor can hydrolyze in the base fluid to form an anionic compound. The scale inhibitor can be selected from the group consisting of inorganic phosphates; organophosphorous compounds, such as phosphate esters and phosphonates; and organic polymers. Typical examples of polymeric scale inhibitors are low molecular weight polymers and copolymers derived from phosphinocarboxylic acid; maleic acid; and water-soluble ethylenically unsaturated monomers, such as acrylic acid, methacrylic acid, vinylphosphonic acid, vinylsulfonic acid, 2-acrylamido2-methylpropanesulfonic acid, and acrylamide; and combinations thereof.

The second treatment fluid and fracturing fluid also include the surface modification agent. The surface modification agent can prevent or decrease the rate of nucleation of scale on the proppant and/or the subterranean formation. The surface modification agent can alter a property of the proppant and/or the subterranean formation. The property can be related to hydrophobicity; positive, negative and/or neutral charges; oil and water-wettability or wettability strengths; and polar, intermediate polar and/or non-polar or polarity strengths. The surface modification agent can have an attraction for and bind to the surface of the proppant or the subterranean formation. The surface modification agent can increase the absorption of the scale inhibitor into the subterranean formation. The desorption rate can be decreased by the surface modification agent, which allows the scale inhibitor to maintain a longer lifetime. The surface modification agent can also prolong the release of a solid scale inhibitor, which provides a longer lifetime. According to certain embodiments, the absorption rate and concentration is altered or the rate of release is altered such that the concentration of the scale inhibitor is maintained at or above the minimum inhibitory concentration for a desired period of time within the wellbore or subterranean formation. The desired period of time can be in the range from about 3 months to 2 years.

The surface modification agent is a hydrophobically modified polyamide or polyester. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

In a copolymer, the repeating units from each of the monomer residues can be arranged in various manners along the polymer chain. For example, the repeating units can be random, alternating, periodic, or block. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules. A second polymer can also be grafted onto the backbone of a first polymer.

According to certain embodiments, the hydrophobically modified polyamide or polyester is formed by modifying a polyamine, a polyimine, or a polyalcohol with a fatty acid, dimer acid, or trimer acid. The hydrophobically modified polyamide can be, for example, a hydrophobically modified polyethylene imine. The backbone of the hydrophobically modified polyamide can be linear or branched. The backbone of the hydrophobically modified polyamide can include one or more cationic functional groups represented by the formula $NR^{+1}$ or $NR^{+4}$. According to certain embodiments, the number of cationic functional groups is selected whereby the surface modification agent has an attraction for and binds to the proppant and/or subterranean formation; for example, due to negatively charged groups of the proppant or formation.

The hydrophobically modified polyamide can also include one or more hydrocarbon side chains. The side chains can have a number of carbon atoms ranging from $C_8$ to $C_{28}$. The hydrophobically modified polyamide can include from about 10 to 2,000 side chains. The number of side chains can also be selected to provide a desired functionality, such as modifying a property (e.g., the hydrophobicity) of the proppant or the subterranean formation and/or altering the absorption rate or release rate of the scale inhibitor.

The hydrophobically modified polyamide or polyester can have a molecular weight in the range of about 800 to 125,000. The molecular weight can depend on the number of hydrocarbon side chains. Accordingly, the molecular weight of the hydrophobically modified polyamide or polyester can be selected to provide a desired functionality, such as modifying a property (e.g., the hydrophobicity) of the proppant or the subterranean formation and/or altering the absorption rate or release rate of the scale inhibitor. According to certain embodiments, the number of hydrocarbon side chains and the molecular weight of the hydrophobically modified polyamide or polyester are selected such that the concentration of the scale inhibitor is maintained at or above the minimum inhibitory concentration for the desired period of time within the wellbore or subterranean formation.

The methods include introducing the first and second treatment fluids into the well. According to this embodiment, the first and second treatment fluids can be used to treat a portion of the subterranean formation. The first treatment fluid can be introduced before or after the second treatment fluid. In this manner, the surface modification agent can be attracted to and bind with a portion of the subterranean formation to alter a property of the subterranean formation. The scale inhibitor can then be introduced into the well and the surface modification agent can increase the lifetime of the scale inhibitor. Alternatively, the scale inhibitor can be introduced first and then the surface modification agent can be introduced to interact with the subterranean formation and scale inhibitor to increase the lifetime of the scale inhibitor. According to these embodiments, the scale inhibitor is a liquid. The first and second treatment fluids can be introduced into the well as part of a squeeze treatment.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example: any transport vessels, conduits, pipelines, trucks, tubulars, and/or pipes used to fluidically move the fluids and additives from one location to another; any pumps, compressors, or motors (e.g., topside or downhole) used to drive the fluids and additives into motion; any valves or related joints used to regulate the pressure or flow rate of the fluids; and any sensors (i.e., pressure and temperature), gauges, and/or combinations thereof. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. It should also be understood that, as used herein, "first," "second," and "third," are assigned arbitrarily and are merely intended to differentiate between two or more additives, etc., as the case may be, and does not indicate any sequence. Furthermore, it is to be understood that the mere use of the word "first" does not require that there be any "second," and the mere use of the word "second" does not require that there be any "third," etc.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
   introducing a fracturing fluid into a well, wherein the introduction of the fracturing fluid creates or enhances a fracture in the subterranean formation, wherein the fracturing fluid comprises:
   (A) an aqueous base fluid selected from the group consisting of fresh water, brackish water, sea water, brine, produced water, and any combination thereof in any proportion;
   (B) proppant which is not coated with a surface modification agent; and
   (C) a scale inhibitor coated with a surface modification agent comprising a hydrophobically modified polyethylene imine.

2. The method according to claim 1, wherein the scale inhibitor is selected from the group consisting of inorganic phosphates; organophosphorous compounds, including phosphate esters and phosphonates; organic polymers; and combinations thereof.

3. The method according to claim 1, wherein the surface modification agent alters a property of the subterranean formation, and wherein the property is hydrophobicity; positive, negative and/or neutral charges; oil and water-wettability or wettability strengths; and polar, intermediate polar and/or non-polar or polarity strengths.

4. The method according to claim 1, wherein the hydrophobically modified polyethylene imine comprises one or more hydrocarbon side chains, and wherein the side chains have a number of carbon atoms ranging from $C_8$ to $C_{28}$.

5. The method according to claim 4, wherein the number of side chains range from about 10 to 2,000.

6. The method according to claim 5, wherein the hydrophobically modified polyethylene imine has a molecular weight in the range of about 800 to 125,000.

7. The method according to claim 1, wherein the rate of release of the scale inhibitor is decreased by the surface modification agent such that the concentration of the scale inhibitor is maintained at or above the minimum inhibitory concentration for a desired period of time within the fracture, and wherein the desired period of time is in the range from about 2 months to 2 years.

8. The method according to claim 1, wherein fracturing fluid is introduced into the well using one or more pumps.

* * * * *